(12) United States Patent  (10) Patent No.: US 8,850,664 B2
Nakamura  (45) Date of Patent: Oct. 7, 2014

(54) HOSE CLAMP

(75) Inventor: Yuji Nakamura, Aichi (JP)

(73) Assignee: Togo Seisakusyo Corporation, Aichi-Gun, Aichi (JP)

( * ) Notice: Subject to any disclaimer, the term of this patent is extended or adjusted under 35 U.S.C. 154(b) by 65 days.

(21) Appl. No.: 13/522,647

(22) PCT Filed: Feb. 12, 2010

(86) PCT No.: PCT/JP2010/052021
§ 371 (c)(1),
(2), (4) Date: Jul. 17, 2012

(87) PCT Pub. No.: WO2011/099136
PCT Pub. Date: Aug. 18, 2011

(65) Prior Publication Data

US 2012/0291232 A1  Nov. 22, 2012

(51) Int. Cl.
*F16L 33/02* (2006.01)
*F16L 33/03* (2006.01)
(52) U.S. Cl.
CPC ..................................... *F16L 33/03* (2013.01)
USPC .................... 24/20 CW; 24/20 EE; 24/23 EE
(58) Field of Classification Search
USPC .... 24/20 R, 20 CW, 20 S, 20 EE, 23 EE, 271
See application file for complete search history.

(56) References Cited

U.S. PATENT DOCUMENTS

| | | | |
|---|---|---|---|
| 3,869,944 A * | 3/1975 | Detiker .............................. | 81/9.3 |
| 4,996,749 A * | 3/1991 | Takahashi ..................... | 24/20 R |
| 5,596,790 A * | 1/1997 | Moller ......................... | 24/20 EE |
| 5,664,295 A * | 9/1997 | Kume et al. ................... | 24/20 R |
| 5,819,376 A * | 10/1998 | Kovalsky et al. ............. | 24/23 R |
| 5,855,044 A * | 1/1999 | Cradduck ..................... | 24/20 R |
| 5,864,926 A * | 2/1999 | Gyongyosi et al. ........... | 24/20 R |
| 5,979,020 A * | 11/1999 | Kimura et al. ................ | 24/20 R |

(Continued)

FOREIGN PATENT DOCUMENTS

| | | |
|---|---|---|
| CN | 1221085 | 6/1999 |
| CN | 101400936 | 4/2009 |

(Continued)

OTHER PUBLICATIONS

International Search Report for PCT/JP2010/052021 mailed Mar. 9, 2010.

*Primary Examiner* — Robert J Sandy
*Assistant Examiner* — David Upchurch
(74) *Attorney, Agent, or Firm* — Smith, Gambrell & Russell LLP

(57) ABSTRACT

A hose clamp includes a body elastically deformable between a closed-diameter state and an opened-diameter state, a first grip piece, a second grip piece, a lock portion located on either the first or second grip piece, a lock receiving portion located on the other grip piece side and elastically displaced together with the lock portion when the grip pieces are caused to come close to each other, thereby being locked to the lock portion by a subsequent return operation. The lock receiving portion holds the body in the opened-diameter state when in a locked state, and a restricting portion is capable of restricting displacement of both grip pieces in reverse of the direction of the elastic displacement. Either the first or second grip piece formed with the restricting portion has a distal end located lower than a distal end of the other grip piece when the body is in the closed-diameter state.

20 Claims, 19 Drawing Sheets

(56) References Cited

U.S. PATENT DOCUMENTS

| | | | |
|---|---|---|---|
| 6,038,744 A * | 3/2000 | Zielinski | 24/20 R |
| 6,098,251 A * | 8/2000 | Zielinski | 24/20 R |
| 6,192,555 B1 * | 2/2001 | Nakamura et al. | 24/20 R |
| 6,343,407 B1 | 2/2002 | Muto et al. | |
| 6,389,650 B1 * | 5/2002 | Yamada et al. | 24/20 R |
| 6,438,801 B1 * | 8/2002 | Yamada | 24/20 R |
| 7,062,821 B2 * | 6/2006 | Sidaine et al. | 24/20 TT |
| 7,305,740 B2 * | 12/2007 | Pina | 24/20 R |
| 7,549,197 B2 * | 6/2009 | Ogino et al. | 24/20 R |
| 8,127,406 B2 | 3/2012 | Morita | |
| 8,231,147 B2 | 7/2012 | Link et al. | |
| 2003/0084548 A1 * | 5/2003 | Nakamura | 24/20 R |
| 2009/0049656 A1 | 2/2009 | Morita | |
| 2009/0151133 A1 * | 6/2009 | Zhang | 24/20 R |
| 2009/0172924 A1 * | 7/2009 | Ito et al. | 24/20 CW |
| 2009/0265894 A1 | 10/2009 | Link et al. | |
| 2010/0083472 A1 * | 4/2010 | Nakamura | 24/16 R |

FOREIGN PATENT DOCUMENTS

| | | |
|---|---|---|
| CN | 101512207 | 8/2009 |
| JP | 8-93980 A | 4/1996 |
| JP | 2001-27382 A | 1/2001 |
| JP | 2003-90474 | 3/2003 |
| JP | 2006-38092 A | 2/2006 |
| JP | 2008-196709 | 8/2008 |

* cited by examiner

HOSE CLAMP

BACKGROUND

1. Technical Field

The present invention relates to a hose clamp.

2. Background Related Art

Hose clamps have conventionally been used for connection between piping and a hose. One type of such hose clamps is disclosed by Japanese Patent Application Publication No. JP-A-H08-93980. The disclosed hose clamp includes a body bent into an annular shape and having two ends formed with grip pieces which are raised from the ends and gripped by a tool, respectively. When gripped to come closer to each other, both grip pieces are elastically deformed radially relative to each other so that a lock portion provided on one grip piece runs onto a receiving portion which is provided on the other grip piece so as to protrude radially outward. After the lock portion has run onto the receiving portion, the grip pieces are returned with deformation, whereby the locking of the lock portion to the receiving portion is completed. Thus, the hose clamp is retained in an opened-diameter state and fitted with an outer circumference of a hose in the opened-diameter state prior to connection.

A bar-like releasing jig is used when a hose is to be clamped. A middle part of the releasing jig is applied to an upper end of the grip piece provided with the receiving portion, thereby serving as a fulcrum of leverage. A distal end of the releasing jig is then applied to a root of the other grip piece, thereby serving as an operating point of leverage. A releasing operation is carried out with the pivot point and the operating point.

As a result, when the body is elastically deformed in reverse order of the above-described elastic deformation in the locking operation to thereby be released from the locked state, the hose clamp is displaced at once by the elastic, restoring force of the body into a closed-diameter state.

Since leverage is used for the release of the hose clamp from the opened-diameter state in the above-described conventional art, the lengths of the respective grip pieces are set to different values for the purpose of smooth operation. More specifically, the grip piece serving as a fulcrum of the leverage (the side provided with the receiving portion) is rendered shorter.

Accordingly, when the grip pieces are gripped by a tool such as pliers for the purpose of transition from the closed-diameter state to the opened-diameter state, the tool assumes an inclined state to the shorter grip piece side, with the result that the shorter grip piece tends to be displaced so as to be lifted. When this occurs, a trajectory at the receiving portion side upwardly deviates from a normal trajectory during the locking operation, whereupon the lock portion cannot be locked to the receiving portion smoothly. This poses a failure.

The present invention was made in view of the foregoing circumstances and an object thereof is to provide a hose clamp which can smoothly be caused to transit from the closed-diameter state to the opened diameter state.

SUMMARY

As means for achieving the object, the present invention provides a hose clamp connecting a hose to piping, comprising a body formed by crossing both ends of a band-shaped spring piece on a circumferential plane while the spring piece is bent into an annular shape, the body being elastically deformable between a closed-diameter state and an opened-diameter state; a first grip piece formed by raising one of the ends of the body radially outward with respect to the body; a second grip piece formed by raising the other end of the body radially outward with respect to the body so as to be opposed to the first grip piece; a lock portion provided on either one of the first or second grip piece so as to extend toward the other grip piece; a lock receiving portion provided on said other grip piece side and elastically displaced together with the lock portion radially with respect to the body relative to each other when the first and second grip pieces are caused to come close to each other along a circumferential direction, thereby being locked to the lock portion by a subsequent return operation, the lock receiving portion holding the body in the opened-diameter state when in a locked state; and a restricting portion provided on one of the ends of the body so as to be located at a position differing from the lock receiving portion, the restricting portion being capable of restricting displacement of both grip pieces in reverse of the direction of the elastic displacement caused during coming close to each other, by abutting against a radially opposed part of the other end of the body. Either the first or second grip piece formed with the restricting portion has a distal end located lower than a distal end of the other grip piece with respect to the radial direction of the body when the body is in the closed-diameter state.

In one embodiment, the restricting portion has a guide surface that is configured to guide a locking operation of the lock portion and the lock receiving portion, by sliding contact with the opposed part of the other end of the body when both grip pieces come close to each other.

In the above-described embodiment, the restricting portion perform a function of guiding the locking operation in addition to a primary function of restricting a trajectory in the case where the locking operation is carried out by the lock portion and the receiving portion. Consequently, the locking operation can be carried out further smoothly.

The restricting portion protrudes-together with one of the ends of the body so as to have a rising slope toward the other end of the body.

In the above-described embodiment, the restricting portion can be provided without increase in the number of parts.

The restricting portion is disposed on a widthwise middle of the body.

In the above-described embodiment, the restricting portion can perform the trajectory restricting function widthwise in a balanced manner.

One of the ends of the body has a lightening hole which is open at a widthwise middle of the body so as to extend lengthwise. A predetermined length of the one end of the body including a part of the lightening hole is bent radially outward to thereby be formed into the first grip piece. The other end of the body has a smaller width so as to be fitted into the lightening hole in a circumferential direction, and a predetermined length of the body at the other end side is bent radially outward to thereby be formed into the second grip piece. The lock portion is formed on the first grip piece side and the lock receiving portion is formed on the second grip piece side. The restricting portion protrudes from a root portion of the second grip piece to thereby be abuttable against the lock portion.

In the above-described embodiment, when both grip pieces are caused to come close to each other, the restricting portion can restrict the trajectory of the locking operation by using the lock portion.

The restricting portion is formed by raising two cutouts CO extending in the circumferential direction of the body, and the end of the restricting portion near the second grip piece serves as a free end.

In the above-described embodiment, since the restricting portion is formed so as to gradually protrude toward the second grip piece, the restricting portion can avoid from collision against the lock portion.

The restricting portion is an inclined surface formed from a part of the root portion of the second grip piece constituting a circumferential surface of the body to a raised part constituting the second grip piece.

The restricting portion is formed into a rib-shape inclined and protruding to an outer surface side so as to extend between a part of the root portion of the second grip piece constituting a circumferential surface of the body and the raised portion constituting the second grip piece.

The restricting portion is a bent portion formed into a step shape in a part of the body extending between a part of the root portion of the second grip piece constituting a circumferential surface of the body and the raised portion constituting the second grip piece.

In the above-described embodiments, since the restricting portion can be formed without provision of an opening in the body, the restricting portion does not result in reduction in the strength of the body.

The lock receiving portion is an opening formed in the second grip piece. The lock portion has a distal end which extends through the opening of the lock receiving portion to thereby be configured to be locked to a circumferentially outer surface side of the second grip piece. The second grip piece has a distal end which is bent in a direction such that the distal end of the second grip piece is spaced from the first grip piece. The distal end of the lock portion is circumferentially inwardly retreated relative to the distal end of the second grip piece when the lock portion is locked to the lock receiving portion.

In the above-described embodiment, when the first and second grip pieces are caused to come close to each other by the tool in order that the body may be put into the opened-diameter state, the lock portion is locked to the underside of the lock receiving portion while the distal end of the lock portion has been passed through the opening of the lock receiving portion. In this case, since the distal end of the lock portion having been passed through the lock receiving portion is located so as to be retreated circumferentially inward relative to the distal end of the second grip piece, the tool has less possibility of interference with the distal end of the lock portion. Accordingly, the body can be put into the opened-diameter state smoothly.

According to the invention, the body end where the restricting portion is not provided has a part opposed to the restricting portion. The restricting portion and the opposed part abut against each other when the first and second grip pieces are gripped to thereby be caused to come close to each other with the body in the reduced-diameter state. As a result, the restricting portion can restrict displacement of the lock portion and the lock receiving portion in the direction opposite the relative elastic deformation of them. Accordingly, the locking operation of the lock portion and the receiving portion can be carried out smoothly.

DETAILED DESCRIPTION

Embodiment 1

Figure 1:
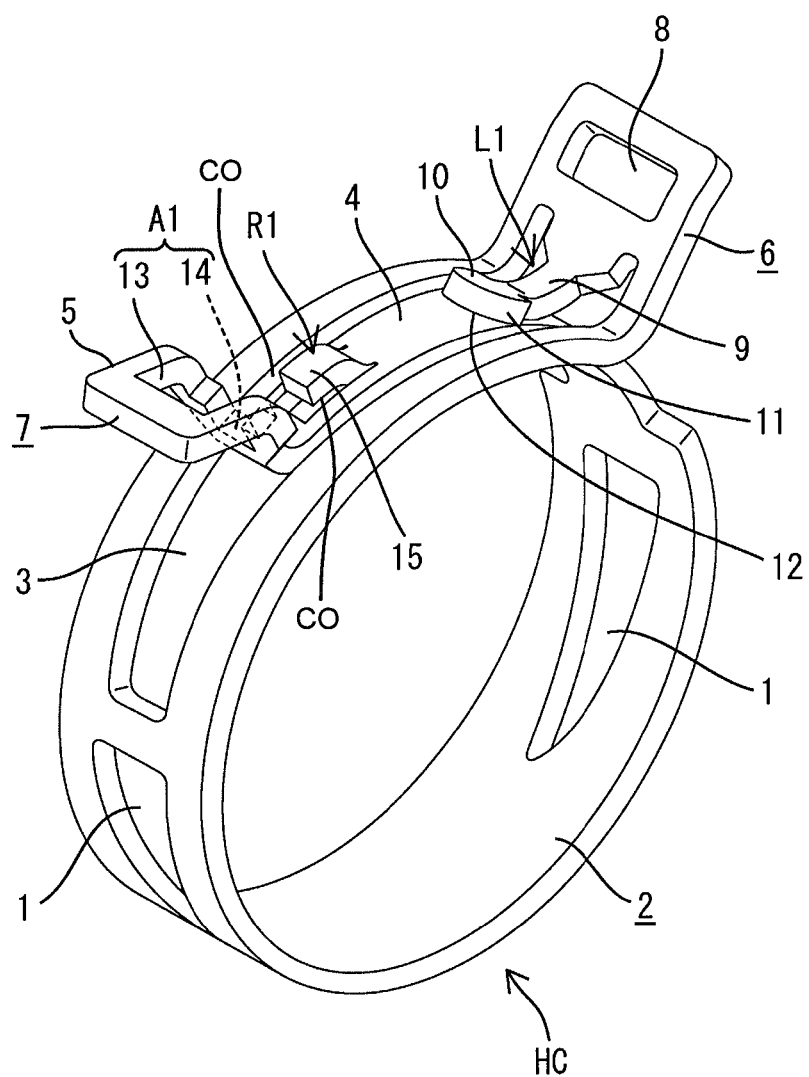
FIG. 1 is a perspective view of the hose clamp according to embodiment 1 in the closed-diameter state.

FIGS. 1 to 7 illustrate embodiment 1 of the invention. A hose clamp HC according to embodiment 1 comprises a metal leaf spring material. The hose clamp HC has an elongated shape in a, developed state thereof and has a pair of triangular windows 1 formed through a lengthwise middle thereof. The hose clamp HC includes a body 2 bent into a ring shape. One side of the body 2 includes a region from the lengthwise middle to one end of the hose clamp HC. The region has a lightening hole 3 formed therethrough. The lightening hole 3 is formed so as be gradually narrower toward the side of one of the triangular windows 1. The other side of the body 2 includes a region in which both widthwise edges are partially removed so that the region is formed into a narrower portion 4. The body 2 is bent so that the narrower portion 4 and the lightening portion 3 are on the same circumferential plane. A predetermined clearance is retained between the narrower portion 4 and an opening edge of the lightening hole 3. The narrower portion 4 has an end with a wider portion 5 which is formed so as to project.

Figure 2:
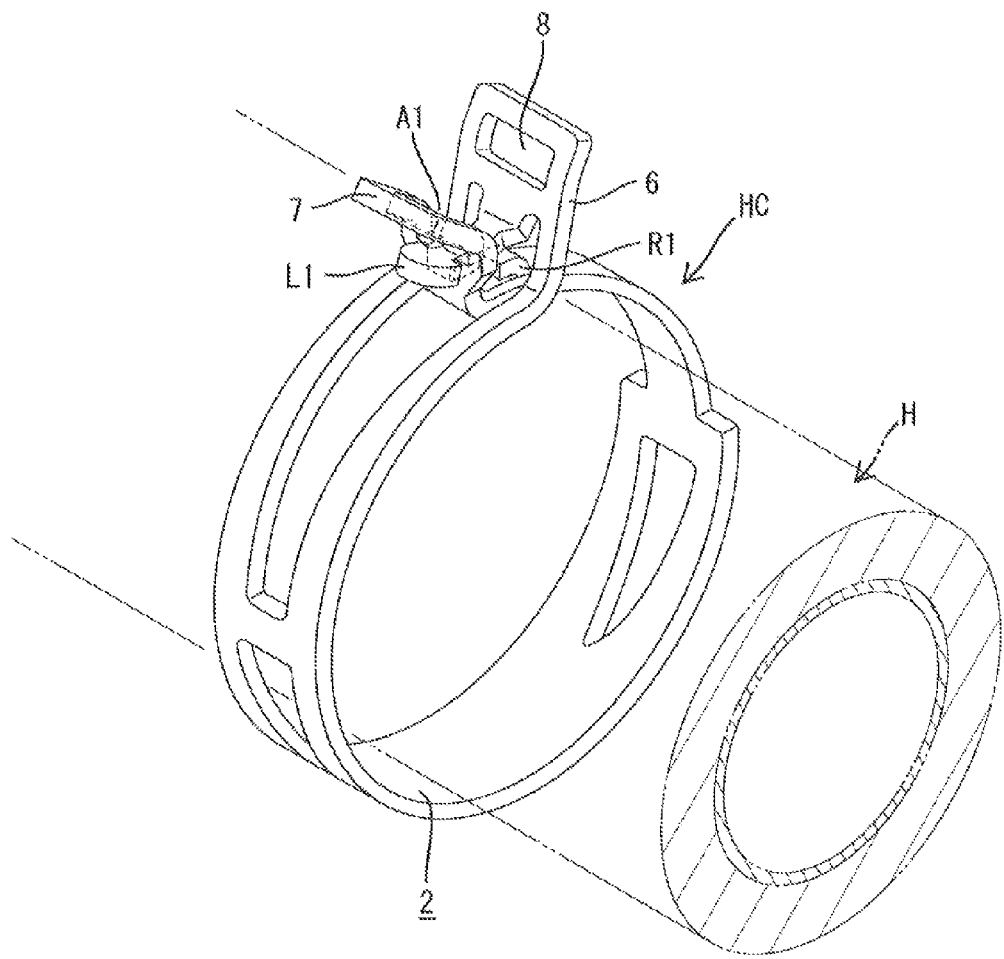
FIG. 2 is also a perspective view of the hose clamp in the opened-diameter state.
Figure 3:
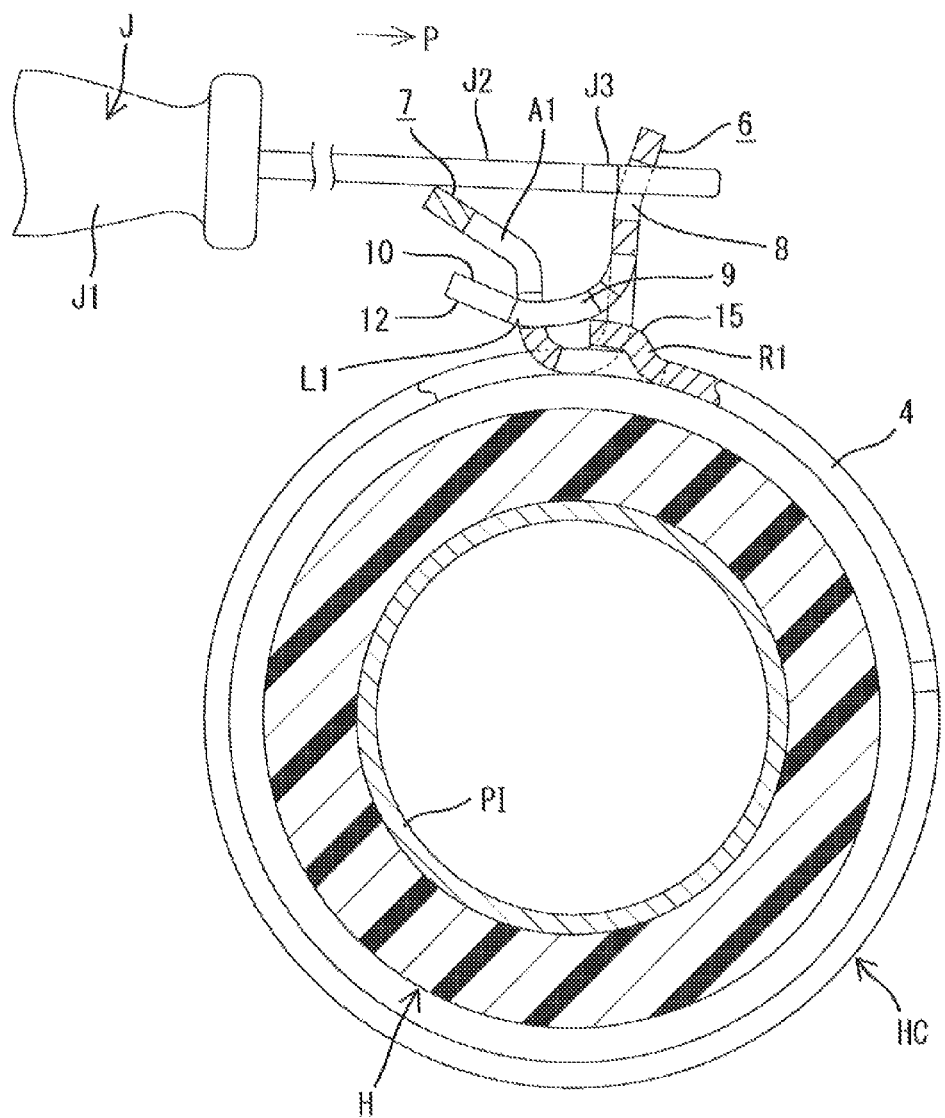
FIG. 3 is a sectional view of the hose clamp, showing a working condition in the case where the hose clamp is released from the opened-diameter state.
Figure 6:
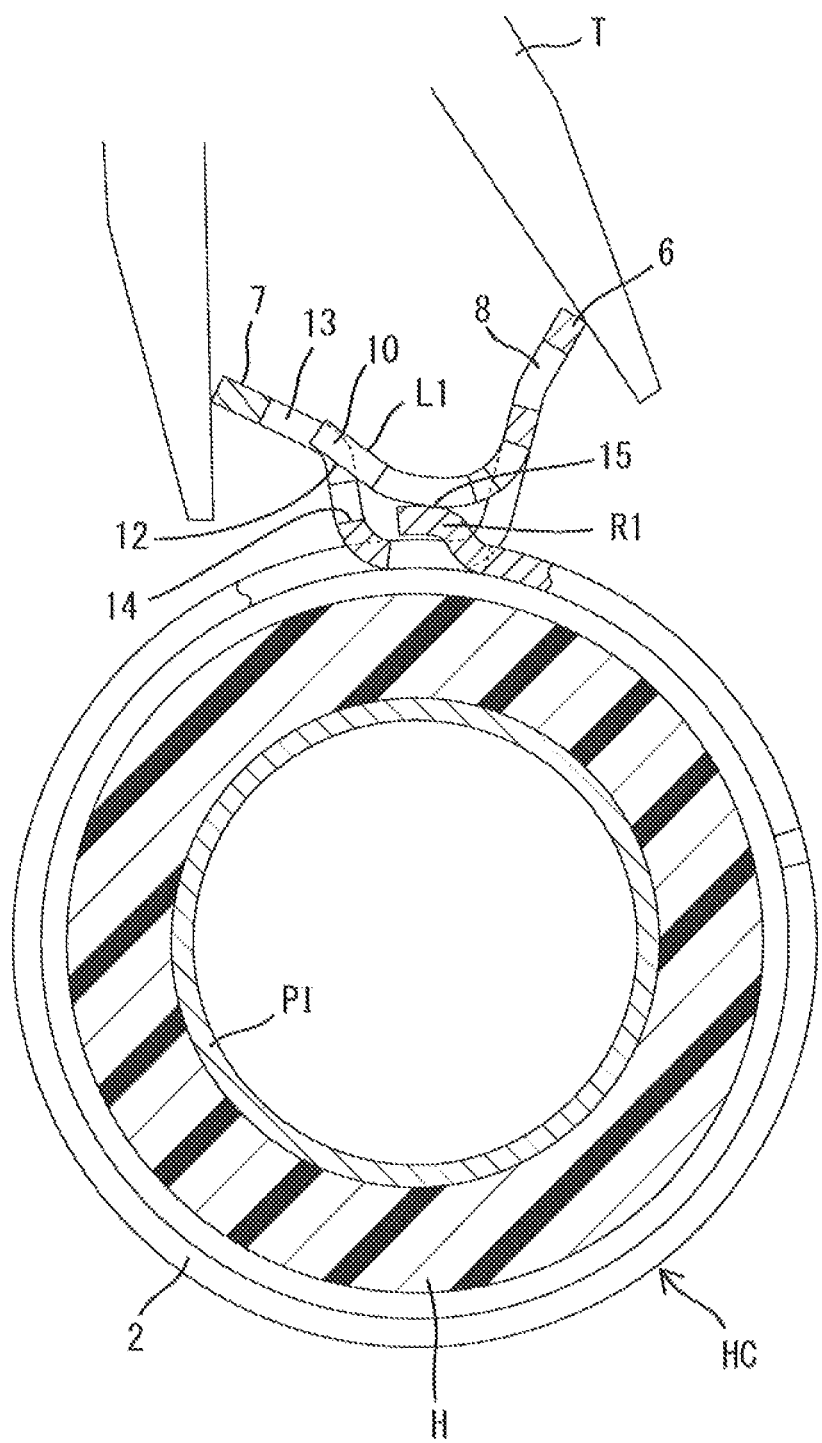
FIG. 6 is a partially broken side view of the hose clamp during the working for transfer from the closed-diameter state to the opened-diameter state.
Figure 7:
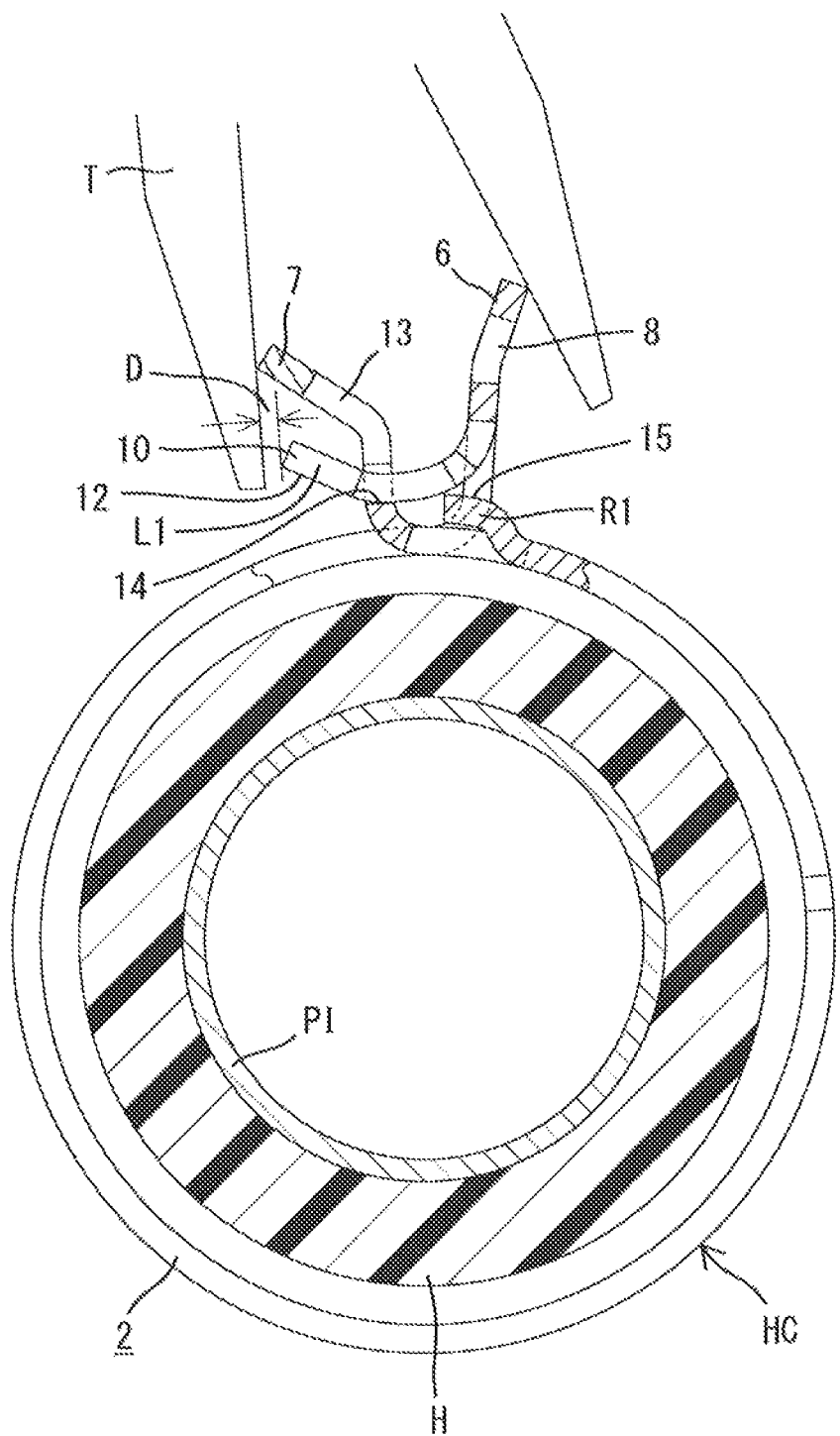
FIG. 7 is also a partially broken side view of the hose clamp at the time of completion of the working.

The end of the body 2 at the side formed with the lightening portion 3 is raised radially outward together with a part of the lightening portion 3 to thereby be formed into a first grip piece 6. The end of the body 2 at the side formed with the wider portion 5 is raised radially outward together with a part of the narrower portion 4 to thereby be formed into a second grip piece 7. The second grip piece 7 is bent outward substantially at a heightwise middle thereof (a height region in which an escape hole 13 is open, as will be described later), as shown in FIGS. 3, 6 and 7. Although both grip pieces 6 and 7 have substantially the same length, the second grip piece 7 is bent in the middle thereof, whereby an upper end of the second grip piece 7 is located lower than an upper end of the first grip piece 6 with respect to a radial direction of the hose clamp HC. Furthermore, the upper end of the second grip piece 7 has a bend allowance that is set so that when the hose clamp HC is retained in an opened-diameter state (the state as shown in FIGS. 2, 7 and the like), a distal end of an arm 9 which will be described later is retreated rearward by a predetermined distance D relative to a distal end of the second grip piece 7 with respect to the horizontal direction. Consequently, when both grip pieces 6 and 7 are caused to come close to each other by a tool T, the tool T can be prevented from abutting against the distal end of the arm 9, whereupon a case pausing a problem for the access of the grip pieces can be avoided.

The first grip piece 6 has an upper end with a through hole 8 formed into a widthwise long rectangular shape. A lock portion L1 protrudes from a lower edge of the through hole 8 or a widthwise middle of the first grip piece 6. The lock portion L1 includes a root portion which gradually becomes narrower downward. The arm 9 is formed by bending a part of the lock portion L1 continuous from the narrower root portion into an arc shape directed toward the second grip portion 7. The arm 9 thereafter extends substantially in parallel to a tangential direction of the body 2. The arm 9 has a distal end which protrudes substantially at a right angle to both widthwise sides to thereby be formed into a claw 10. The claw 10 has an outer circumference formed with an arc surface 11 extending from a distal end to both widthwise sides. Furthermore, the claw 10 is formed with a guide surface 12 that is cambered from the arm 9.

The second grip piece 7 has a receiving portion A1 which is open and to which the claw 10 of the lock portion L1 is locked. The receiving portion A1 includes a wide escape hole 13 formed in an upper side thereof and a narrow lock hole 14 that is formed in a lower side thereof so as to communicate with the escape hole 13. The escape hole 13 is open and has an opening sized so that the claw 10 of the lock portion L1 is inserted into and pulled out of the escape hole 13. The lock hole 14 has a width such that the arm 9 is radially fittable thereinto but the claw 10 is disallowed to pass therethrough circumferentially. The hose clamp HC is retained in the opened-diameter state when the claw is locked into the lock hole 14. In this case, an inner diameter of the body 2 is set so as to be larger than an outer diameter of a hose H to be connected. In contrast, when the claw 10 and the lock hole 14 are disengaged from each other such that the lock portion L1 is pulled out of the receiving portion A1, the body 2 assumes a closed-diameter state (a state as shown in FIG. 1 and the like) by an elastic restoring force thereof. In this case, the inner diameter of the body 2 is set so as to be sufficiently smaller than the outer diameter of the hose H.

A restricting portion R1 is provided on a root portion of the second grip piece 7 on the circumferential surface of the body 2. The restricting portion R1 serves to restrict uplift of the second grip piece 7 side when the hose clamp HC is caused to transition from the closed-diameter state to the opened-diameter state. The restricting portion R1 is formed by providing two cutouts CO which are widthwise spaced and extend circumferentially on the circumferential surface of the body 2 and further by raising a part between the cutouts CO so that the part has an end which is located near the second grip piece 7 and serves as a free end.

The restricting portion R1 has an upper surface which is formed into a guide surface 15 for guiding the lock portion L1 into the receiving portion A1. The guide surface 15 is formed so as to rise from the root portion of the restricting portion R1 with a gradual arc surface and thereafter so as to extend along the circumferential surface of the body 2 to the free end. The restricting portion R1 has an amount of projection that is set so that the guide surface 15 is brought into sliding contact with the underside of the lock portion L1 when both grip pieces 6 and 7 are operated so as to come close to each other. The amount of projection of the restricting portion R1 is also set so that the underside of the distal end of the claw 10 can be guided to a lower edge of the escape hole 13 in the receiving portion A1 when the lock portion L1 has traveled to the opposed surface of the second grip piece 7 while in abutment with the restricting portion R1.

Thus, such deformation that the second grip piece 7 side projects outward from the circumferential surface of the body 2 is restricted by the abutment of the lock portion L1 and the restricting portion R1. On the contrary, the first grip piece 6 side is allowed to be lifted radially outward and the second grip piece 7 side is allowed to be lowered radially inward.

Figure 5:
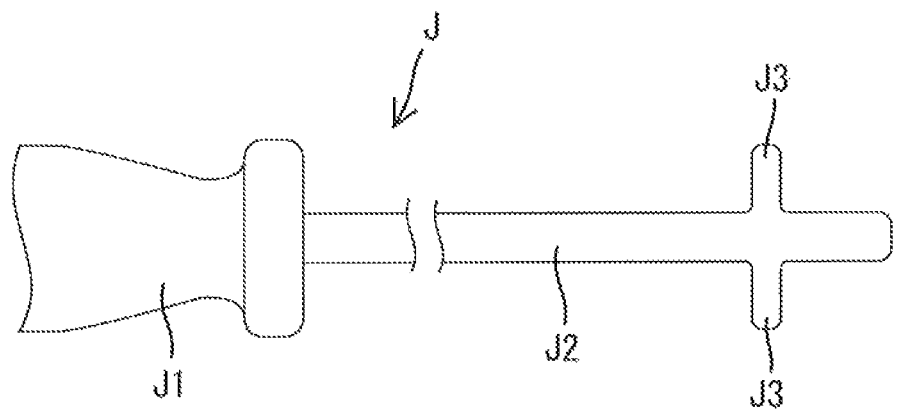
FIG. 5 is a plan view of a releasing jig.

The following will describe the connecting work of the piping PI and the hose H by the use of the hose clamp HC. Prior to the connecting work, the hose clamp HC assuming the opened-diameter state is loosely fitted with the hose H through an end of the hose H. In this state, the hose H is connected to the piping PI, and the hose clamp HC is moved to the connection of the hose H and the piping PI. Subsequently, the hose clamp HC is released from the opened-diameter state using a releasing jig J as shown in FIG. 5. The releasing jig J includes a grip portion J1 and a releasing portion J2 formed of a flat plate material. A pair of stopper pieces J3 are provided at the distal end side of the releasing portion J2 so as to protrude to both opposed sides respectively.

Figure 4:
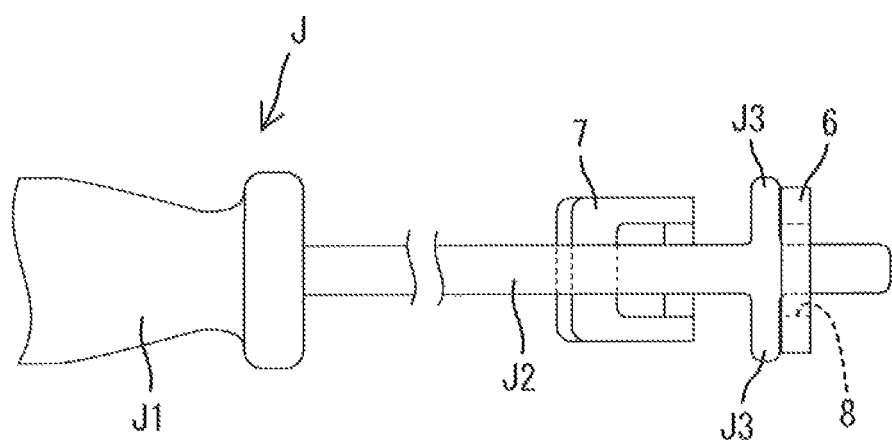
FIG. 4 is a plan view of the hose clamp, showing a relevant part of a working condition in the case where the hose clamp is released from the opened-diameter state.

When the hose clamp HC is released from the opened-diameter state, the releasing portion J2 is passed above the second grip piece 7 to be moved forward to the first grip piece 6 side. The first grip piece 6 has wall surface portions between which the through hole 8 is widthwise located. The releasing portion J2 has a distal end inserted through the through hole 8, and both stopper pieces J3 are abutted against the respective wall surface portions of the first grip piece 6 (the state as shown in FIG. 4). When the releasing jig J is then thrust in the direction of arrow P in FIG. 3, the hose clamp HC makes an angular displacement around the hose H. As the result of the angular displacement, the hose clamp HC is disallowed to turn when the upper end of the second grip piece 7 abuts against a middle part of the releasing jig J2 (the state as shown in FIG. 3). When further thrust, the releasing jig J exerts a depressing force on the second grip piece 7, whereas the releasing jig J exerts a lifting force on the first grip piece 6. Accordingly, the claw 10 of the lock portion L1 is disengaged from the lock hole 14 of the receiving portion A1. Thus, the lock portion L1 is released from the locking to the receiving portion A1. At this moment, the body 2 moves in the diameter-reducing direction at once by an elastic restoring force thereof to thereby clamp the connection of the hose H and the piping, whereby the hose H connecting work is completed.

Since the upper end of the second grip piece 7 side is located lower than the upper end of the first grip piece 6 in the embodiment, the distal end of the releasing portion J2 can easily be inserted through the through hole 8. Furthermore, the thrusting force can be applied to the upper end of the second grip piece 7 substantially in the radial direction. Consequently, the releasing force can effectively work.

When the hose clamp HC is returned to the opened-diameter state, the upper ends of both grip pieces 6 and 7 are gripped by the tool T such as pliers so as to come close to each other as shown in FIGS. 6 and 7. The underside of the lock portion L1 is brought into sliding contact with the guide surface 15 of the restricting portion R1 and accordingly, the distal end of the claw 10 is guided to the location where the distal end of the claw 10 faces the lower edge of the escape hole 13. The claw is formed so as to be cambered. Accordingly, upon further progress of the gripping operation from this state, the first grip piece 6 side is elastically displaced radially outward and the second grip piece 7 side is elastically displaced radially inward relatively, in the course of the sliding contact of the underside of the claw 10 with the lower edge of the escape hole 13. Thus, the claw 10 enters deep into the escape hole 13 while gradually running onto the lower edge of the escape hole 13. When the entire claw 10 is inserted through the receiving portion A1, the elastic restoring force of the body 2 causes relative displacement of the grip pieces 6 and 7 reverse relative to the above-described displacement, whereupon the arm 9 enters the lock hole 14 and the claw 10 is locked to the wall surfaces at both sides of the lock hole 14. Consequently, the hose clamp HC is retained in the opened-diameter state again.

The second grip piece 7 is formed to be shorter than the first grip piece 6 in the embodiment. Accordingly, when both grip pieces 6 and 7 are caused to come close to each other, the tool T is easy to incline to the second grip piece 7 side such that the second grip piece 7 tends to be lifted. However, when both grip pieces 6 and 7 are caused to come close to each other, the lock portion L1 abuts against the restricting portion R1, whereby the lifting of the second grip piece 7 side is restricted. Consequently, both grip pieces 6 and 7 can secure a normal trajectory in the case of the locking operation of the lock portion L1 to the receiving portion A1. This ensures smooth transfer from the closed-diameter state to the opened-diameter state.

Additionally, even when the hose clamp HC is released from the opened-diameter state to thereby be caused to transition to the closed-diameter state, the lock portion L1 abuts against the restricting portion R1. This can contribute to smooth transition to the closed-diameter state.

Furthermore, the free end of the restricting portion R1 is configured to be directed to the second grip piece 7 side. More specifically, the free end of the restricting portion R1 is configured not to face the lock portion L1 in the direction in which the lock portion L1 comes close to the restricting portion R1. Consequently, the interference of the lock portion L1 with the restricting portion R1 can be avoided when both grip pieces 6 and 7 are caused to come close to each other. Furthermore, since the restricting portion R1 is disposed on the widthwise middle of the body 2, the restricting portion R1 can carry out both the restricting of the trajectory of the grip pieces 6 and 7 and the guide of the locking operation widthwise in a balanced manner.

Furthermore, the distal end of the arm 9 is located so as to be retreated rearward relative to the distal end of the second grip piece 7 with respect to the horizontal direction. Accordingly, even when both grip pieces 6 and 7 are caused to come close to each other by the tool T to thereby assume the opened-diameter state as shown in FIG. 7, the interference of the tool T with the arm 9 is avoided during transition to the opened-diameter state. Consequently, the transition work can be carried out smoothly.

Embodiment 2

Figure 8:
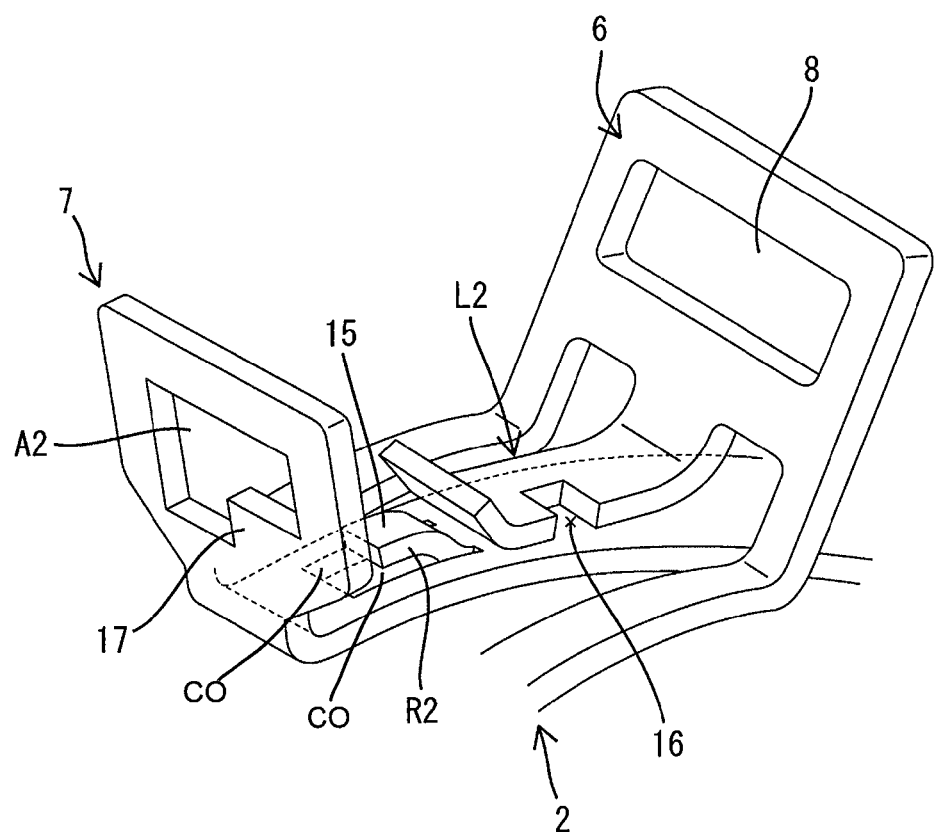
FIG. 8 is a perspective view of the lock portion and the receiving portion of a hose clamp according to embodiment 2.

FIG. 8 illustrates embodiment 2. A lock portion L2 in the embodiment is formed so as to have a uniform width from the root portion to the distal end and has a lock recess 16 formed by notching a widthwise one side near the distal end thereof. On the other hand, a one side, half of the lower edge of the receiving portion A2 opposed to the lock recess 16 is formed with a lock stepped portion 17 which is higher.

When both grip pieces 6 and 7 are caused to come close to each other, the distal end of the lock portion L2 receiving the guiding operation of the guide surface 15 of the restricting portion R2 is inserted into a space above the lock stepped portion 17, and the lock stepped portion 17 is fitted into the lock recess 16 by the elastic restoring force of the body 2, thereby being locked. Consequently, the hose clamp HC can be retained in the opened-diameter state.

The operation to release the hose clamp HC from the opened-diameter state is carried by thrusting the releasing jig J in the same manner as in embodiment 1.

Since the other construction of the hose clam HC is the same as in embodiment 1, the duplicated description will be eliminated.

Embodiment 3

Figure 9:
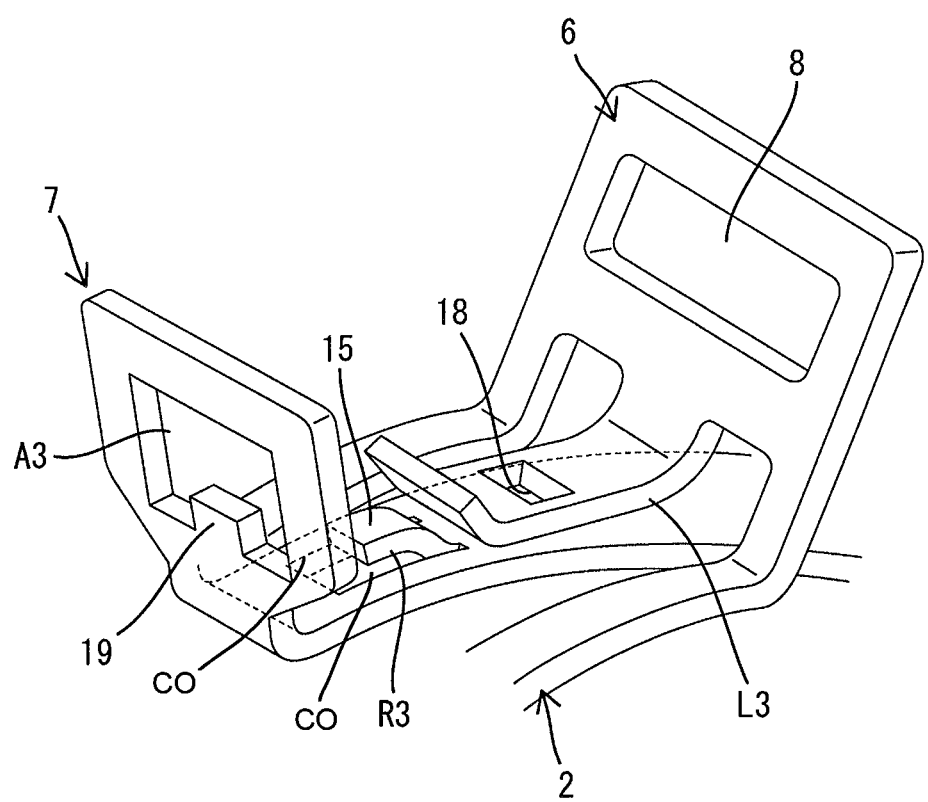
FIG. 9 is a perspective view of the lock portion and the receiving portion of a hose clamp according to embodiment 3.

FIG. 9 illustrates embodiment 3. A lock portion L3 in the embodiment has a uniform width and is formed with a square lock hole 18 located at the widthwise middle near the distal end thereof. On the other hand, a lock protrusion 19 is formed so as to protrude from the widthwise middle of the lower end of the receiving portion A3.

When both grip pieces 6 and 7 are caused to come close to each other, the lock portion L3 receives the guiding operation of the guide surface 15 of the restricting portion R3 to thereby be inserted into a space above the lock protrusion 19 in the receiving portion A3. When the lock protrusion 19 and the lock hole 18 are fitted with each other, the lock-protrusion 19 is fitted into the lock hole 18 by the elastic restoring force of the body 2. Consequently, the hose clamp HC can be retained in the opened-diameter state.

The operation to release the hose clamp HC from the opened-diameter state is the same as in each foregoing embodiment. The other construction of the hose clamp HC is the same as in embodiments 1 and 2.

Embodiment 4

Figure 10:
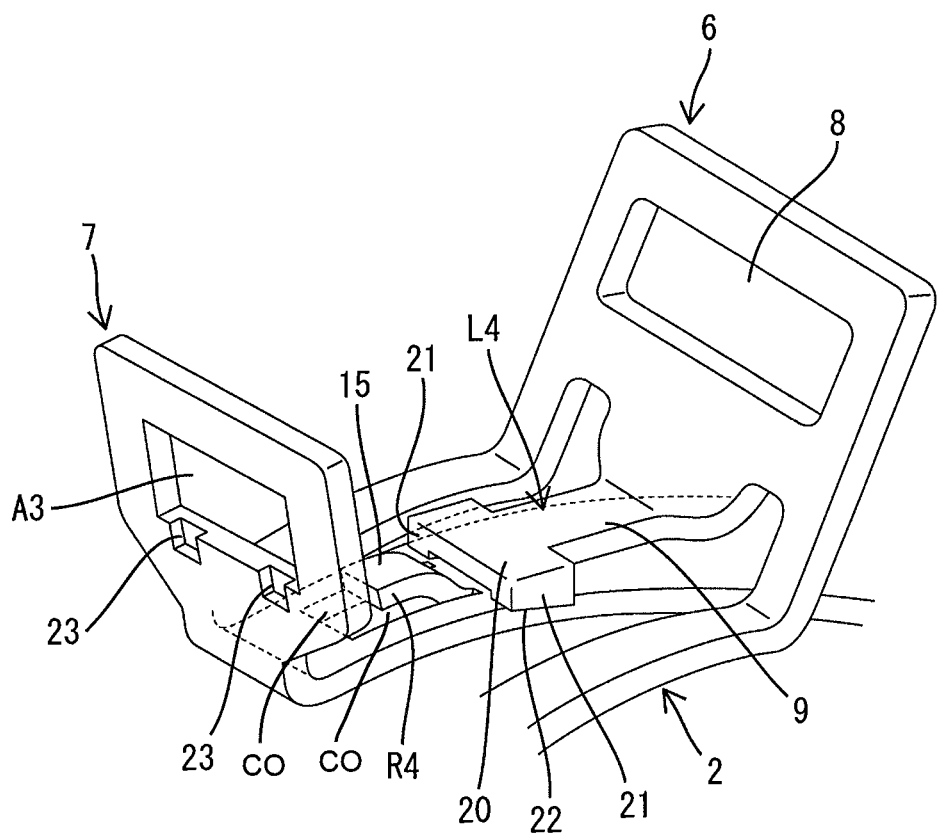
FIG. 10 is a perspective view of the lock portion and the receiving portion of hose clamp according to embodiment 4.

FIG. 10 illustrates fourth embodiment 4. In a lock portion L4 in the embodiment, the distal end of arm 9 is expanded to both widthwise sides to thereby be formed into an expanded portion 20. Both side edges of the expanded portion 20 are projected downward to thereby be formed into catching edges 21 respectively. Inclined surfaces 22 are formed on the lower edges of both catching edges 21 respectively. Each inclined surface 22 has a rising slope toward the distal end side so that the locking operation of the lock portion L4 and the receiving portion A4 is smoothly carried out. On the other hand, a pair of lock grooves 23 are formed by recessing an outer surface side of the lower edge of the receiving portion A4 (the rear surface side of the surface opposed to the lock portion L4).

When both grip pieces 6 and 7 are caused to come close to each other, the lock portion L4 receives the guiding operation of the guide surface 15 of the restricting portion R4 with the result that the expanded portion 20 is inserted into the receiving portion A4. When the entire lock portion L4 passes through the receiving portion A4, both catching edges 21 are fitted into the corresponding lock grooves 23 by the elastic restoring force of the body 2, thereby being locked. Consequently, since the lock portion L4 is locked to the receiving portion A4 without widthwise displacement, the hose clamp HC can stably be retained in the opened-diameter state.

The operation to release the hose clamp-HC from the opened-diameter state is the same as in each foregoing embodiment. The other construction of the hose clamp HC is the same as in the foregoing embodiments.

Embodiment 5

Figure 11:
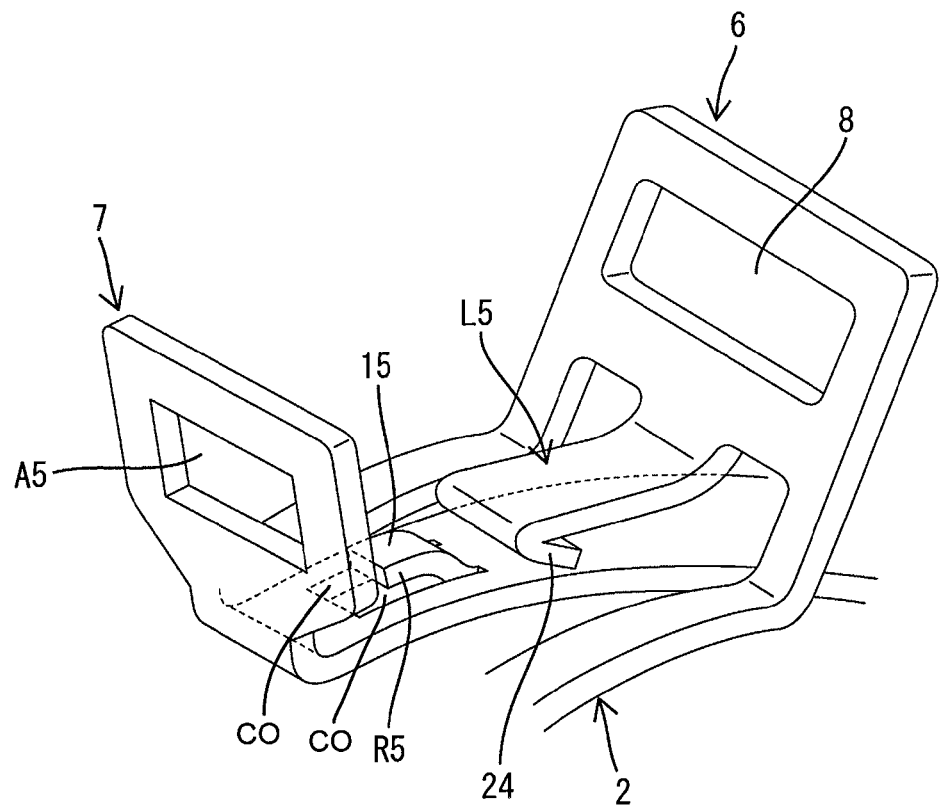
FIG. 11 is a perspective view of the lock portion and the receiving portion of a hose clamp according to embodiment 5.

FIG. 11 illustrates embodiment 5. A lock portion L5 in the embodiment has a uniform width and is formed with a folded piece 24 on a distal end thereof. The folded piece 24 is directed obliquely downward. When both grip pieces 6 and 7 are caused to come close to each other, the folded piece 24 is brought into sliding contact with the guide surface 15 of the restricting portion R5, with the result that the locking operation of the lock portion L5 and the receiving portion A5 is guided. When the entire folded piece 24 has passed through the receiving portion A5, the folded piece 24 is locked to the lower edge of the receiving portion A5 by the elastic restoring force of the body 2, whereby the hose clamp HC is retained in the opened-diameter state. The operation to release the hose clamp HC from the opened-diameter state is the same as in each foregoing embodiment. The other construction of the hose clamp HC is the same as in the foregoing embodiments.

Embodiment 6

Figure 12:
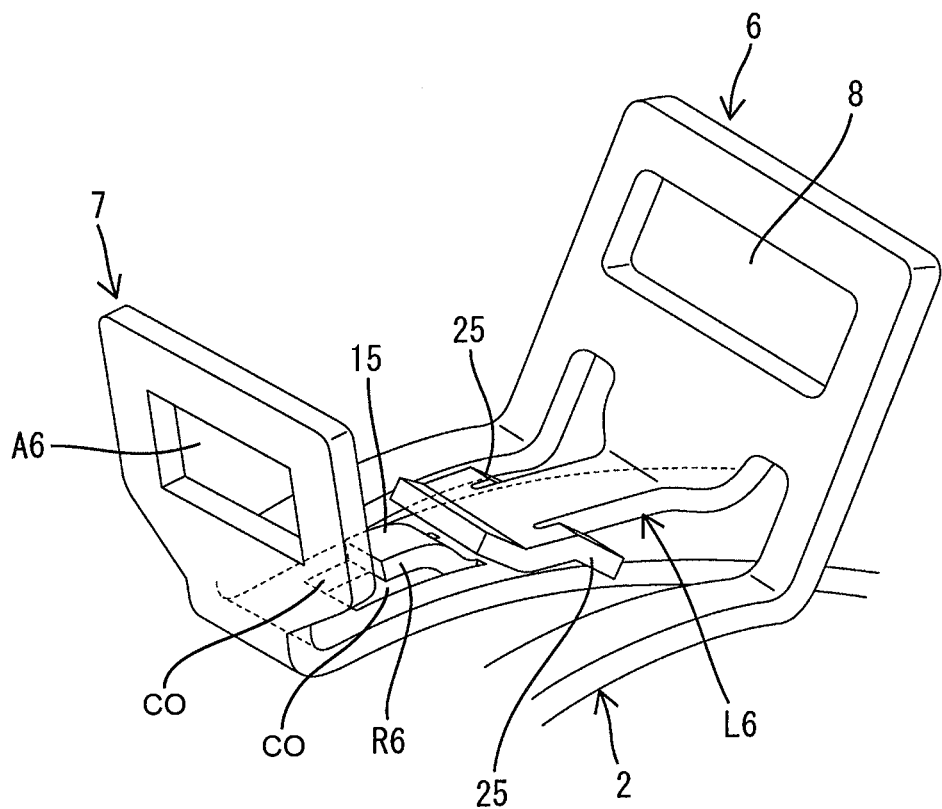
FIG. 12 is a perspective view of the lock portion and the receiving portion of a hose clap according to embodiment 6.

FIG. 12 illustrates embodiment 6. A lock portion L6 has a distal end which has a larger width and is cambered. A part of the lock portion L6 from a rear edge of the wider portion to the middle leading to the distal end side is notched and thereafter bent obliquely downward, whereby a pair of lock claws are formed. When both grip pieces 6 and 7 are caused to come close to each other, the wider portion is brought into sliding contact with the guide surface 15 of the restricting portion R6, with the result that the locking operation of the lock portion L6 and the receiving portion A6 is guided. When both lock claws have passed through the receiving portion A6, the lock claws are locked to the lower edge of the receiving portion A6 by the elastic restoring force of the body 2, whereby the hose clamp HC is retained in the opened-diameter state. The operation to release the hose clamp HC from the opened-diameter state is the same as in each foregoing embodiment. The other construction of the hose clamp HC is the same as in each foregoing embodiment.

Embodiment 7

Figure 13:
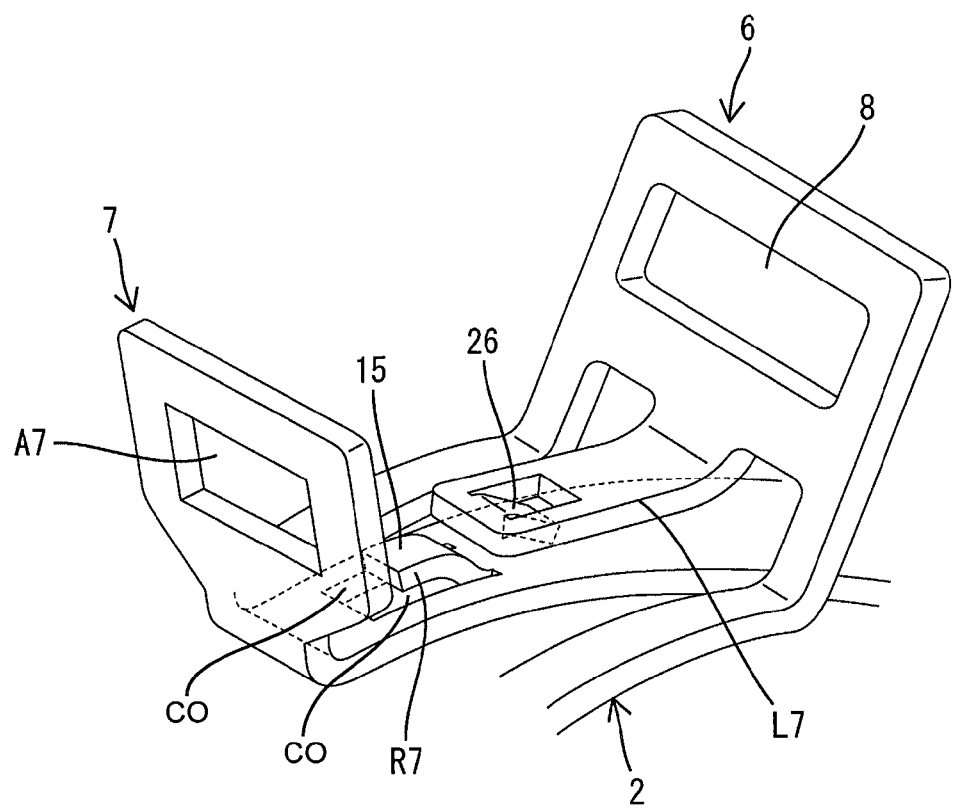
FIG. 13 is a perspective view of the lock portion and the receiving portion of a hose clamp according to embodiment 7.

FIG. 13 illustrates embodiment 7. A lock portion L7 in the embodiment is formed so as to have a uniform width and has a catch claw 26 projecting from near the distal end and directed downward. The catch claw 26 is formed by cutting and raising so as to extend obliquely rearward from the distal end side. When both grip pieces 6 and 7 are caused to come close to each other, the catch claw 26 is brought into sliding contact with the guide surface 15 of the restricting portion R7, with the result that the locking operation of the lock portion L7 and the receiving portion A7 is guided. When the catch claw 26 has passed through the receiving portion A7, the catch claw 26 is locked to the lower edge of the receiving portion A6 by the elastic restoring force of the body 2, whereby the hose clamp HC is retained in the opened-diameter state. The operation to release the hose clamp HC from the opened-diameter state is the same as in each foregoing embodiment. The other construction of the hose clamp HC is the same as in each foregoing embodiment.

Embodiment 8

Figure 14:
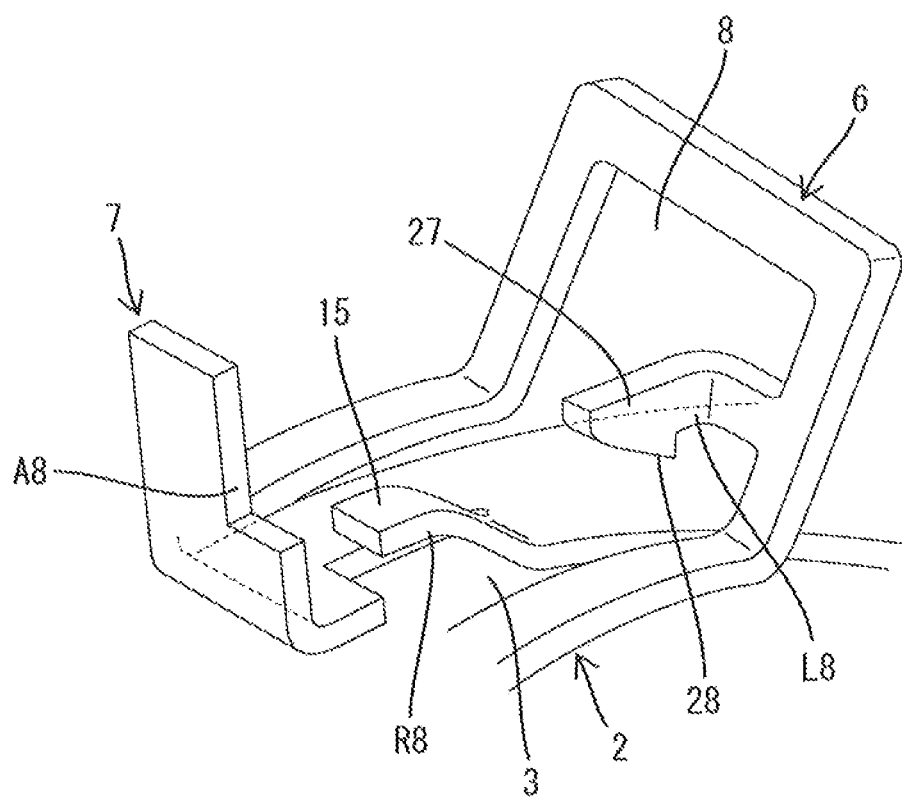
FIG. 14 is a perspective view of the lock portion and the receiving portion of a hose clamp according to embodiment 8.

FIG. 14 illustrates embodiment 8. A lock portion L8 in the embodiment includes, as a free end, one end side of the piece partitioning the through hole 8 and the lightening hole 3. The end side is bent to the second grip piece 7 side substantially at a right angle. A claw piece 27 is formed on the distal end of the lock portion L8. The claw piece 27 has an underside formed with an inclined surface 28 cambered toward the distal end. The restricting portion R8 is disposed on one widthwise side of the root portion of the second grip piece 7 so that the claw piece 27 is located substantially beneath a trajectory of the claw piece 27 when both grip pieces 6 and 7 come close to each other. On the other hand, the receiving portion A8 is cut out from a part of one side of the distal end of the second grip piece 7, which part ranges from the upper end to a predetermined height.

When both grip pieces 6 and 7 are caused to come close to each other, the inclined surface 28 of the claw piece 27 of the lock portion L8 is brought into sliding contact with the guide surface 15 of the restricting portion R8, so that the locking operation of the lock portion L8 to the receiving portion A8 is guided. The lock portion L8 is locked to the receiving portion A8 by the restoring force of the body 2 when the claw piece 27 has passed through the receiving portion A8, whereby the hose clamp HC is retained in the opened-diameter state. The operation to release the hose clamp HC from the opened-diameter state is the same as in each foregoing embodiment. The other construction of the hose clamp HC is the same as in each foregoing embodiment.

Embodiment 9

Figure 15:
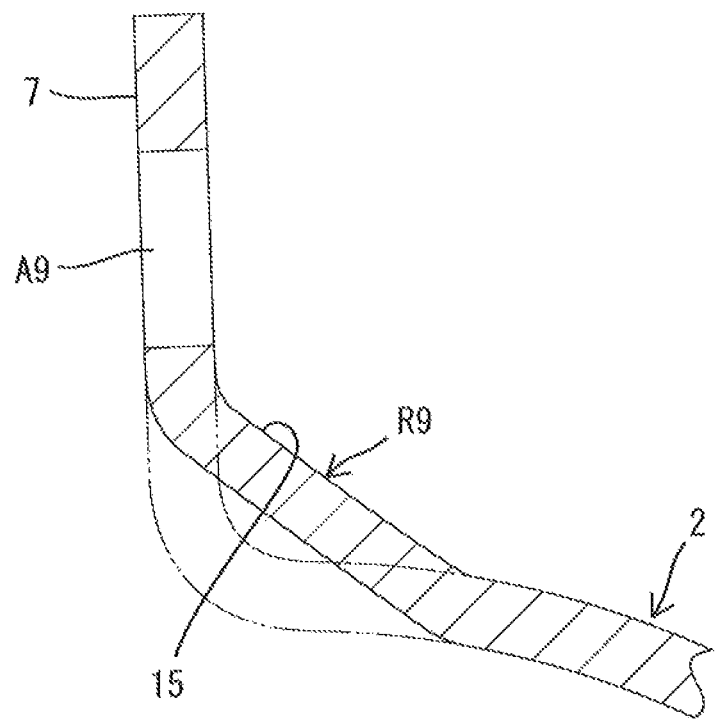
FIG. 15 is a sectional view of the restricting portion of a hose clamp according to embodiment 9.
Figure 16:
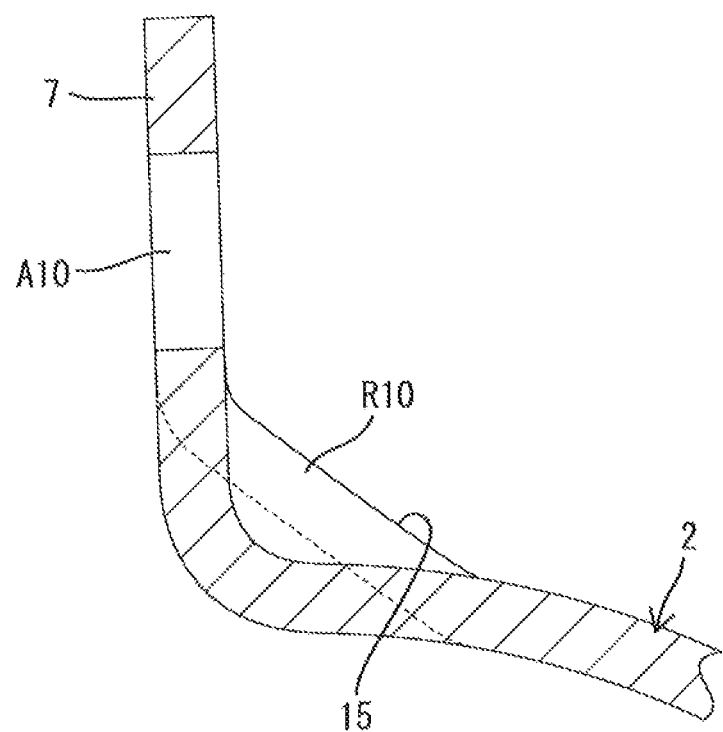
FIG. 16 is a sectional view of the restricting portion of a hose clamp according to embodiment 10.
Figure 17:
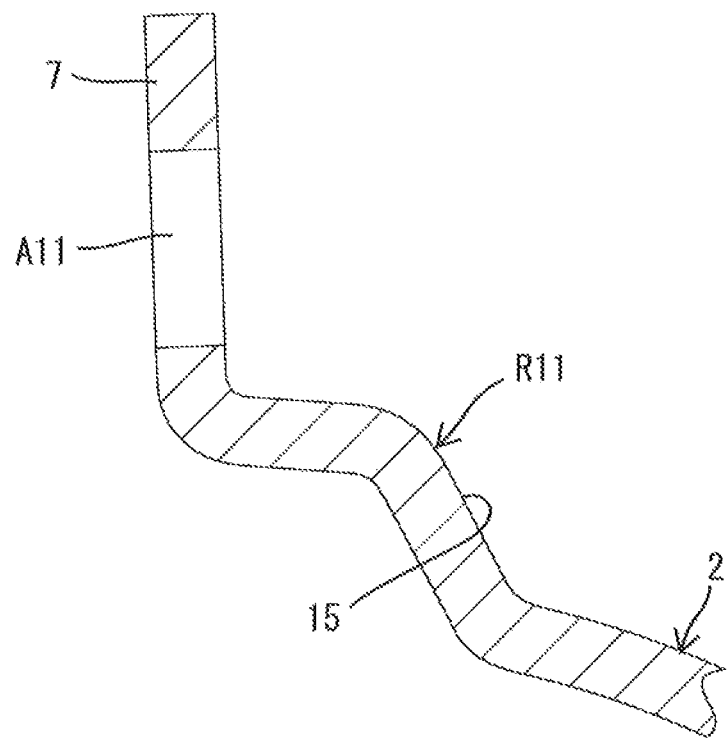
FIG. 17 is a sectional view of the restricting portion of a hose clamp according to embodiment 11.

FIGS. 15 to 17 show several embodiments of the restricting portion. FIG. 15 illustrates embodiment 9. The restricting portion is formed by cutting and raising the body in each foregoing embodiment. In embodiment 9, however, the root portion of the second grip piece 7 includes a part composing the circumferential surface of the body 2 and a raised part composing the second grip piece 7. A restricting portion R9 in embodiment 9 is formed by bending a portion between these parts over an entire width into an inclined shape. This inclined surface forms the guide surface 15 and has an upper edge configured to be located near the lower edge of the receiving portion A9. The other construction of the hose clamp HC is the same as in each foregoing embodiment.

Embodiment 10

FIG. 16 illustrate embodiment 10. Although the restricting portion R9 is formed so as to be ranged over the entire width of the root portion of the second grip piece 7, a restricting portion R10 is formed by beating a widthwise middle of the second grip piece 7 in a predetermined width by pressing into the shape of an inclined rib. The other construction of the hose clamp HC is the same as in each foregoing embodiment.

Embodiment 11

FIG. 17 illustrates embodiment 11. The restricting portion R9 in embodiment 9 is formed as the inclined surface ranging from a part composing the circumferential surface of the body 2 to a part composing the second grip piece 7. A restricting portion R11 in embodiment 11 is formed into a stepped shape.

Embodiment 12

Figure 18:
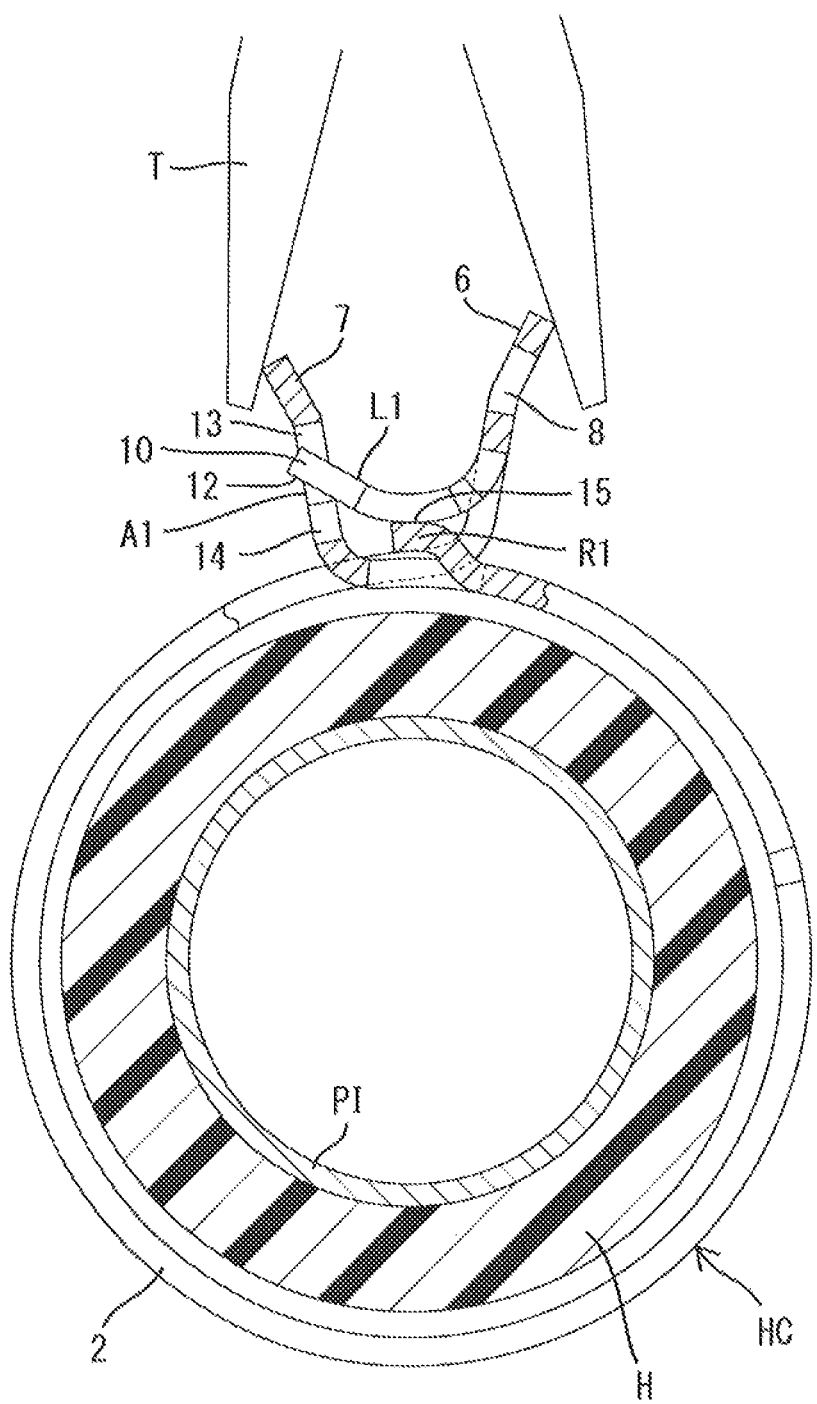
FIG. 18 is a partially broken side view of a hose clamp according to embodiment 12.

FIG. 18 illustrates embodiment 12. Embodiment 12 has the same basic construction as embodiment 1. The difference is that only the distal end of the second grip piece 7 is merely slightly bent outward in the same manner as the first grip piece 6 in embodiment 12 although the second grip piece 7 is bent outward from a heightwise middle to a large degree in the embodiment 1. Even in this construction, as long as the second grip piece 7 is lightly gripped by the distal end of the tool T, the interference of the lock portion L1 and the tool T is avoided in gripping both grip pieces 6 and 7 by the too T, whereupon even the hose clamp with the above-described construction is sufficiently usable.

Embodiment 13

Figure 19:
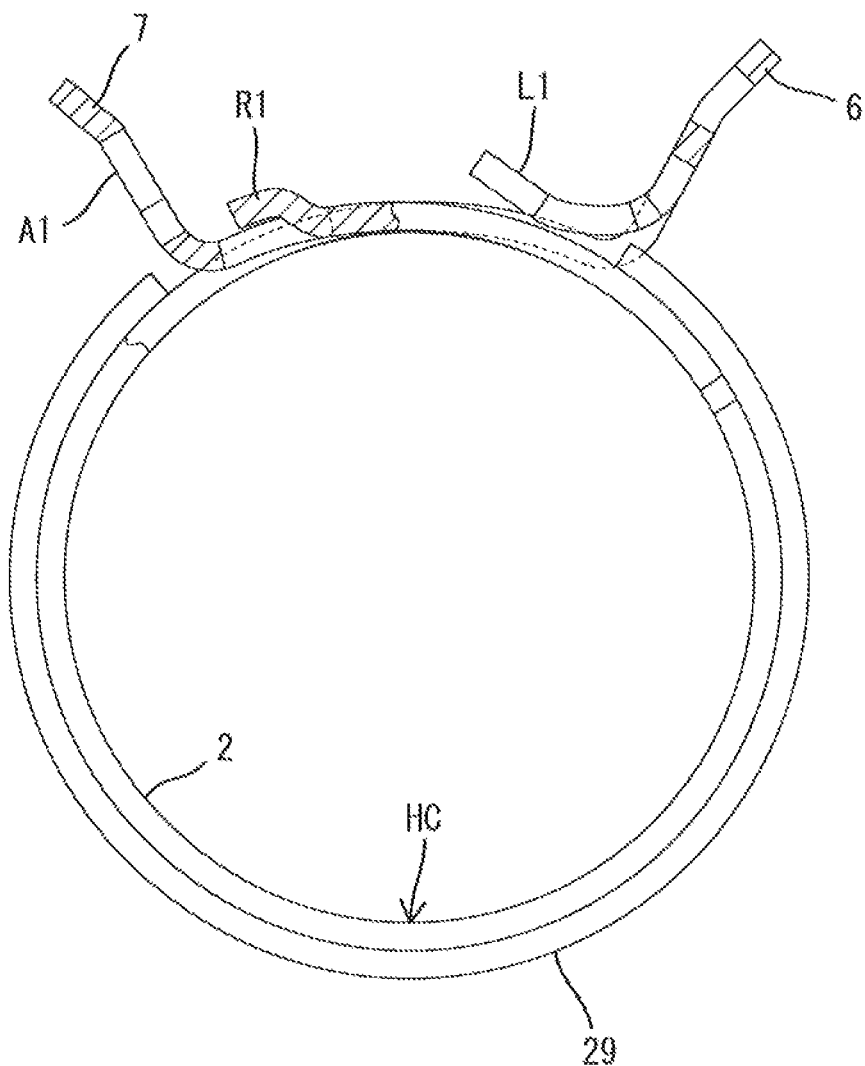
FIG. 19 is a partially broken side view of a hose clamp according to embodiment 13.

FIG. 19 illustrates embodiment 13. In embodiment 13, the hose clamp HC of embodiment 12 is used, and an auxiliary ring 29 for spring reinforcement is mounted on the outer circumference of the body 2. The auxiliary ring 29 is formed of a plate material made of the same material as the body 2 and has substantially the same width as the body 2. The auxiliary ring 29 is formed by cutting off part of an annular shape. Furthermore, the auxiliary ring 29 is fitted to the outer circumference of the body 2 so as to closely adhere along substantially the entire outer circumference except for the part between both grip pieces 6 and 7. The auxiliary ring 29 is maintained in the closely adherent state while the body 2 is elastically deformed between the opened-diameter state and the closed-diameter state.

The problem to overcome by the present invention is that one side of the second grip piece 7 is displaced from the normal trajectory during both grip pieces' coming close to each other to thereby be lifted. Such a phenomenon is considered to be likely to occur in the case of narrow hoses H as an object to be connected to the pipe or more specifically, in the hose clamp HC which has little choice but to be made of a thin plate material having a small diameter and a relatively lower stiffness. The embodiment is significant in that the hose clamp HC with such a lower spring force can be reinforced and the second grip piece 7 can follow the normal trajectory when both grip pieces 6 and 7 comes close to each other.

Other Embodiments

The invention should not be limited to the embodiments described above with reference to the drawings but the technical scope of the invention includes the following embodiments:

(1) Although the restricting portion is formed integrally with the hose clamp in each foregoing embodiment, the restricting portion may be independent of the hose clamp and may be assembled to the hose clamp.

(2) Although the lock portion may be formed on the second grip piece side, instead of the first grip piece side.

(3) In each foregoing embodiment, the restricting portion has the function of being brought into sliding contact with the lock portion in switching the hose clamp HC to the opened-diameter state to thereby guide the locking of the lock portion. The guiding function is not an essential function, and accordingly, only the function of restricting the radial displacement is essential.

EXPLANATION OF REFERENCE SYMBOLS

2 . . . body
6 . . . first grip piece
7 . . . second grip piece
10 . . . claw
15 . . . guide surface
29 . . . auxiliary ring
A1 to A11 . . . receiving portion
L1 to L11 . . . lock portion
R1 to R11 . . . restricting portion
H . . . hose
HC . . . hose clamp

The invention claimed is:

1. A hose clamp connecting a hose to piping, comprising:
a body formed by crossing both ends of a band-shaped spring piece on a circumferential plane while the spring piece is bent into an annular shape, the body being elastically deformable between a closed-diameter state and an opened-diameter state;
a first grip piece formed by raising one of the ends of the body radially outward with respect to the body;
a second grip piece formed by raising the other end of the body radially outward with respect to the body so as to be opposed to the first grip piece;
a lock portion provided on either one of the first or second grip piece so as to extend toward the other grip piece;
a lock receiving portion provided on said other grip piece side and elastically displaced together with the lock portion radially with respect to the body relative to each other when the first and second grip pieces are caused to come close to each other along a circumferential direction, thereby being locked to the lock portion by a subsequent return operation, the lock receiving portion holding the body in the opened-diameter state when in a locked state; and
a restricting portion provided on one of the ends of the body so as to be located at a position differing from the lock receiving portion, the restricting portion being capable of restricting displacement of both grip pieces in reverse of the direction of the elastic displacement caused during coming close to each other, by abutting against a radially opposed part of the other end of the body, wherein either the first or second grip piece formed with the restricting portion has a distal end located lower than a distal end of the other grip piece with respect to the radial direction of the body when the body is in the closed-diameter state.

2. The hose clamp according to claim 1, wherein the restricting portion has a guide surface that is configured to guide a locking operation of the lock portion and the lock receiving portion, by sliding contact with the opposed part of the other end of the body when both grip pieces come close to each other.

3. The hose clamp according to claim 1, wherein the restricting portion protrudes together with one of the ends of the body so as to have a rising slope toward the other end of the body.

4. The hose clamp according to claim 3, wherein the restricting portion is disposed on a widthwise middle of the body.

5. The hose clamp according to claim 1, wherein one of the ends of the body has a lightening hole which is open at a widthwise middle of the body so as to extend lengthwise;
a predetermined length of the one end of the body including a part of the lightening hole is bent radially outward to thereby be formed into the first grip piece;
the other end of the body has a smaller width so as to be fitted into the lightening hole in a circumferential direction, and a predetermined length of the body at the other end side is bent radially outward to thereby be formed into the second grip piece;
the lock portion is formed on the first grip piece side and the lock receiving portion is formed on the second grip piece side; and the restricting portion protrudes from a root portion of the second grip piece to thereby be abuttable against the lock portion.

6. The hose clamp according to claim 5, wherein the restricting portion is formed by raising two cutouts extending in the circumferential direction of the body, and the end of the restricting portion near the second grip piece serves as a free end.

7. The hose clamp according to claim 5, wherein the restricting portion is an inclined surface formed from a part of the root portion of the second grip piece constituting a circumferential surface of the body to a raised part constituting the second grip piece.

8. The hose clamp according to claim 5, wherein the restricting portion is formed into a rib-shape inclined and protruding to an outer surface side so as to extend between a part of the root portion of the second grip piece constituting a circumferential surface of the body and the raised portion constituting the second grip piece.

9. The hose clamp according to claim 5, wherein the restricting portion is a bent portion formed into a step shape in a part of the body extending between a part of the root portion of the second grip piece constituting a circumferential surface of the body and the raised portion constituting the second grip piece.

10. The hose clamp according to claim 5, wherein the lock receiving portion is an opening formed in the second grip piece;
  the lock portion has a distal end which extends through the opening of the lock receiving portion to thereby be configured to be locked to a circumferentially outer surface side of the second grip piece;
  the second grip piece has a distal end which is bent in a direction such that the distal end of the second grip piece is spaced from the first grip piece; and
  the distal end of the lock portion is circumferentially inwardly retreated relative to the distal end of the second grip piece when the lock portion is locked to the lock receiving portion.

11. The hose clamp according to claim 2, wherein the restricting portion protrudes together with one of the ends of the body so as to have a rising slope toward the other end of the body.

12. The hose clamp according to claim 11, wherein the restricting portion is disposed on a widthwise middle of the body.

13. The hose clamp according to claim 2, wherein one of the ends of the body has a lightening hole which is open at a widthwise middle of the body so as to extend lengthwise;
  a predetermined length of the one end of the body including a part of the lightening hole is bent radially outward to thereby be formed into the first grip piece;
  the other end of the body has a smaller width so as to be fitted into the lightening hole in a circumferential direction, and a predetermined length of the body at the other end side is bent radially outward to thereby be formed into the second grip piece;
  the lock portion is formed on the first grip piece side and the lock receiving portion is formed on the second grip piece side; and
  the restricting portion protrudes from a root portion of the second grip piece to thereby be abuttable against the lock portion.

14. The hose clamp according to claim 13, wherein the restricting portion is formed by raising two cutouts extending in the circumferential direction of the body, and the end of the restricting portion near the second grip piece serves as a free end.

15. The hose clamp according to claim 13, wherein the restricting portion is an inclined surface formed from a part of the root portion of the second grip piece constituting a circumferential surface of the body to a raised part constituting the second grip piece.

16. The hose clamp according to claim 13, wherein the restricting portion is formed into a rib-shape inclined and protruding to an outer surface side so as to extend between a part of the root portion of the second grip piece constituting a circumferential surface of the body and the raised portion constituting the second grip piece.

17. The hose clamp according to claim 13, wherein the restricting portion is a bent portion formed into a step shape in a part of the body extending between a part of the root portion of the second grip piece constituting a circumferential surface of the body and the raised portion constituting the second grip piece.

18. The hose clamp according to claim 13, wherein the lock receiving portion is an opening formed in the second grip piece;
  the lock portion has a distal end which extends through the opening of the lock receiving portion to thereby be configured to be locked to a circumferentially outer surface side of the second grip piece;
  the second grip piece has a distal end which is bent in a direction such that the distal end of the second grip piece is spaced from the first grip piece; and
  the distal end of the lock portion is circumferentially inwardly retreated relative to the distal end of the second grip piece when the lock portion is locked to the lock receiving portion.

19. The hose clamp according to claim 1, wherein the restricting portion has a radial outer guide surface and said locking receiving portion defines an opening for receiving the lock portion and which opening extends radially outward farther than the radial outer guide surface.

20. The hose clamp according to claim 19, wherein the opening of said lock receiving portion comprises an escape hole with an upper edge and a lower edge and the radial outer guide surface of the restricting portion is positioned to guide the lock portion to the lower edge of the escape hole.

* * * * *